United States Patent
Sakurai et al.

(10) Patent No.: US 9,049,284 B2
(45) Date of Patent: Jun. 2, 2015

(54) ELECTRONIC DEVICE WITH PARTIALLY ILLUMINATED ANNULAR INPUT UNIT

(75) Inventors: Tomonori Sakurai, Kawasaki (JP); Chikara Kobayashi, Kato (JP); Jiro Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 13/253,608

(22) Filed: Oct. 5, 2011

(65) Prior Publication Data

US 2012/0113652 A1 May 10, 2012

(30) Foreign Application Priority Data

Nov. 10, 2010 (JP) .................. 2010-252112

(51) Int. Cl.
G01D 11/28 (2006.01)
H04M 1/23 (2006.01)
H01H 21/02 (2006.01)
H04M 1/02 (2006.01)

(52) U.S. Cl.
CPC ............ H04M 1/233 (2013.01); H01H 21/025 (2013.01); H01H 2219/062 (2013.01); H01H 2219/0622 (2013.01); H04M 1/0235 (2013.01)

(58) Field of Classification Search
CPC .............. H01H 21/025; H01H 23/025; H01H 2219/0622; H01H 2219/062
USPC ............. 362/23.09, 23.1, 23.16, 23.17, 23.2, 362/3.13

See application file for complete search history.

(56) References Cited

U.S. PATENT DOCUMENTS 6,590,508 B1* 7/2003 Howell et al. .................. 341/22
2006/0227532 A1* 10/2006 Ko et al. ......................... 362/85

FOREIGN PATENT DOCUMENTS

| JP | 2-62748 U | 5/1990 |
|---|---|---|
| JP | 61-167327 U | 10/1996 |
| JP | 2000-215761 A | 8/2000 |
| JP | 2001-185004 | 7/2001 |
| JP | 2001-251401 | 9/2001 |
| JP | 2001-352379 A | 12/2001 |
| JP | 2002-328733 | 11/2002 |
| JP | 2003-272485 | 9/2003 |
| JP | 2005-197037 | 7/2005 |
| JP | 2010-257801 A | 11/2010 |
| KR | 10-2008-0046520 A | 5/2008 |

OTHER PUBLICATIONS

Korean Office Action mailed Oct. 15, 2012 for corresponding Korean Application No. 10-2011-116366, with English-language Translation.

Korean Office Action mailed Jun. 26, 2013 for corresponding Korean Application No. 10-2011-116366, with Partial English-language Translation.

(Continued)

*Primary Examiner* — Robert May
(74) *Attorney, Agent, or Firm* — Fujitsu Patent Center

(57) ABSTRACT

An electronic device includes a case, a multi-directional input unit having an annular base and a flange that extends from an outer circumferential surface of the annular base and fits part of the case, the flange guiding light emitted from a light source and radiating the light; and a cover having a through-hole through which part of the multi-directional input unit passes, the cover abutting the flange and being secured to the case.

7 Claims, 7 Drawing Sheets

(56) References Cited

OTHER PUBLICATIONS

CNOA—Office Action of Chinese Patent Application No. 201110347938.7 dated Aug. 6, 2014 with English translation of Office Action.

JPOA—Office Action of Japanese Patent Application No. 2010-252112 dated Oct. 14, 2014 with partial English language translation.
Office Action of Japanese Patent Application No. 2010-252112 dated Feb. 12, 2014 with Partial Translation.
CNOA—Office Action of Chinese Patent Application No. 201110347938.7 dated Feb. 11, 2015 with full English translation.

* cited by examiner

ELECTRONIC DEVICE WITH PARTIALLY ILLUMINATED ANNULAR INPUT UNIT

CROSS-REFERENCE TO RELATED APPLICATIONS

This application is based upon and claims the benefit of priority from the prior Japanese Patent Application No. 2010-252112 filed on Nov. 10, 2010, the entire contents of which are incorporated herein by reference.

FIELD

The embodiment discussed herein relates to an electronic device.

BACKGROUND

With conventional electronic devices such as mobile telephones, it is known that a key module including translucent key tops is put into a case and light emitted by light sources is guided to the key tops and radiated therefrom. An illumination effect may be obtained by radiating light emitted by the light sources from the key tops.

A multi-directional input unit is known as one of the input units intended for electronic devices of this type. For example, a multi-directional input unit including a rotationally operated encoder is disclosed in Japanese Laid-open Patent Publication No. 2000-215761, the encoder being structured so as to accept rotating, pressing, and tilting operations performed by a user. As for the rotationally operated encoder, to improve the visibility, the entire multi-directional input unit is formed of a translucent material and light emitted by light sources is radiated from the multi-directional input unit.

In the technology described in Japanese Laid-open Patent Publication No. 2000-215761, however, no consideration is given to improvement of the illumination effect brought by the use of light emitted from the light sources and to parts that are likely to come off the case.

That is, the prior art lacks novelty in illumination because light emitted from light sources is radiated from an entire translucent multi-directional input unit, and thereby the prior art does not visually satisfy users. Thus, it is desired to improve the illumination effect brought by the use of light emitted from light sources. Furthermore, in the prior art, there is no ingenuity to prevent the multi-directional input unit from coming off the case, so the multi-directional input unit may come off the case and may be lost when it is operated by a user.

SUMMARY

According to an aspect of the embodiment, an electronic device includes a case, a multi-directional input unit having an annular base and a flange that extends from an outer circumferential surface of the annular base and fits part of the case, the flange guiding light emitted from a light source and radiating the light; and a cover having a through-hole through which part of the multi-directional input unit passes, the cover abutting the flange and being secured to the case.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of an electronic device in this disclosure will be described in detail with reference to the drawings. The embodiment does not restrict the electronic device in the disclosure. For example, in the embodiment below, a mobile telephone will be described as an example of the electronic device, but this is not a limitation. The embodiment may also be applied to electronic devices such as personal digital assistants (PDAs).

Figure 1:
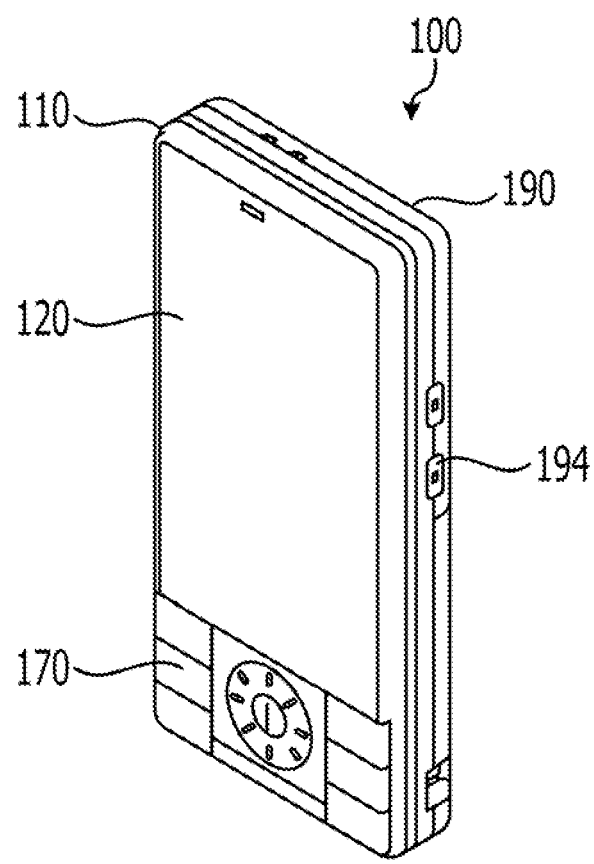
FIG. 1 is a perspective view illustrating an external appearance of a mobile telephone according to an embodiment in a state in which a display-side case is closed.
Figure 2:
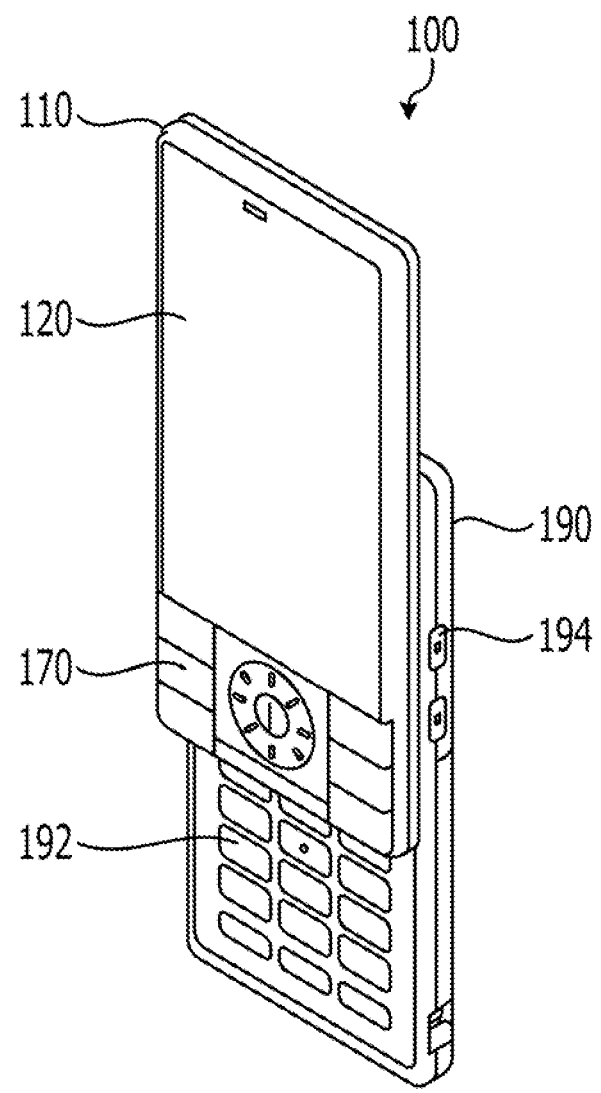
FIG. 2 is a perspective view illustrating an external appearance of the mobile telephone according to the embodiment in a state in which the display-side case is open.
Figure 3:
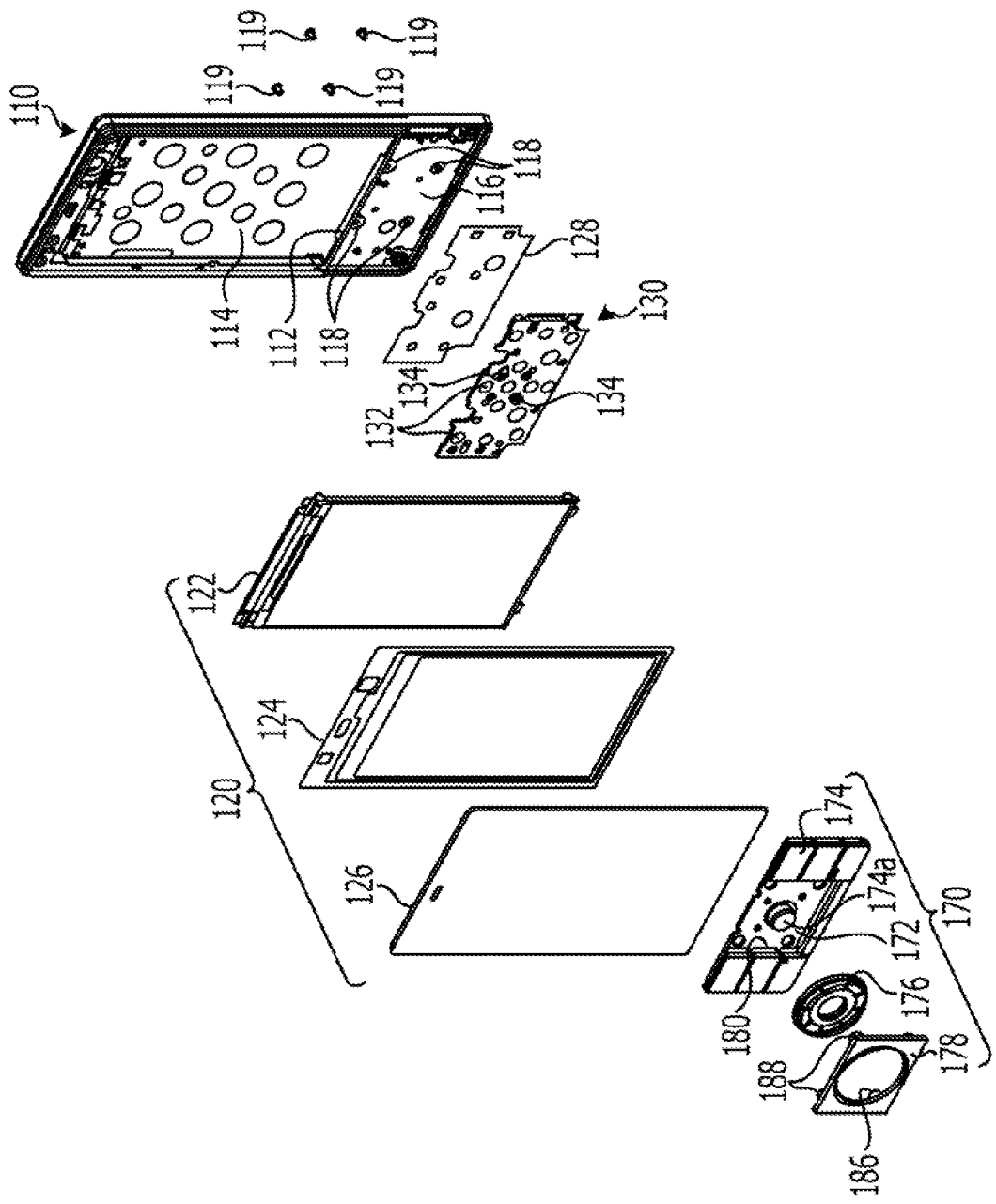
FIG. 3 is an exploded perspective view of the display-side case of the mobile telephone according to the embodiment.

FIG. 1 is a perspective view illustrating an external appearance of a mobile telephone according to an embodiment in a state in which a display-side case may be closed without being slid. FIG. 2 is a perspective view illustrating an external appearance of the mobile telephone according to the embodiment in a state in which the display-side case may open by being slid. FIG. 3 is an exploded perspective view of the display-side case of the mobile telephone according to the embodiment.

As illustrated in FIGS. 1 and 2, the mobile telephone 100 in the embodiment has a display-side case 110 and an operation-side case 190. The display-side case 110 and operation-side case 190 are mutually linked so as to be relatively slidable through a sliding mechanism (not shown). FIG. 1 illustrates a closed state in which the display-side case 110 is entirely overlaid on the operation-side case 190. In FIG. 2, the display-side case 110 has been slid, illustrating an open state in which the display-side case 110 overlaps the operation-side case 190 within the minimum overlap range. When the mobile telephone 100 of this slide type is not used, it is placed in the closed state by overlaying the display-side case 110 on the operation-side case 190.

As illustrated in FIG. 3, one surface of the display-side case 110 has an opening. The interior of the display-side case 110 is partitioned with a partition wall 112 erected from the bottom of the display-side case 110, forming a first interior 114 in which parts are accommodated and also forming a second interior 116. The first interior 114 includes a display part 120. The second interior 116 includes a printed circuit board 130, which is attached to the bottom of the display-side case 110 with a double-sided adhesive tape 128, and a front key module 170 placed on the printed circuit board 130. The front key module 170 is an operational module used to perform various operations on the mobile telephone 100.

The display part 120 includes a display module 122, a packing 124, and a display panel 126 such as a liquid crystal panel. The display module 122 is placed at the bottom of the display-side case 110, and the display panel 126 is placed on the same side as the opening of the display-side case 110, with the packing 124 intervening. The packing 124 is placed between the display panel 126 and the display module 122 to seal the circumference of the display surface of the display module 122, preventing foreign substances from entering the clearance between the display panel 126 and the display surface of the display module 122. The packing 124 spaces the display panel 126 apart from the display surface of the display module 122 to prevent blurred display and other problems that would otherwise be caused when the display surface comes in contact with the display panel 126.

On the printed circuit board 130, a plurality of contact switches such as metal domes 132 and a plurality of other various parts such as light emitting diodes (LEDs) 134 are mounted on the surface facing the front key module 170. Part of the plurality of LEDs 134 is mounted at positions corresponding to a central key top 174a described later, which is one of a plurality of key tops 174 of the front key module 170, and emits light toward the central key top 174a upon receipt of electric power from the printed circuit board 130.

The front key module 170 includes a rectangular base rubber 172 placed on the printed circuit board 130 and the plurality of key tops 174 attached to the base rubber 172. The front key module 170 further includes a multi-directional input unit 176 attached to the base rubber 172 and a cover 178 placed on the base rubber 172. The base rubber 172 is made of a translucent material to guide light emitted from LEDs 134 mounted on the printed circuit board 130 to the central key top 174a. Projection-shaped pressing knobs, which press the metal domes 132, are formed at positions corresponding to the positions of the metal domes 132 on a surface of the base rubber 172, the surface facing the printed circuit board 130. When a user presses a key top 174, the relevant pressing knob presses its corresponding metal dome 132.

The plurality of key tops 174 are attached along three sides of the base rubber 172. Each of the plurality of key tops 174 has a flange 180 that extends from a side surface facing the center of the base rubber 172 toward the center of the base rubber 172. The central key top 174a, which is one of the plurality of key tops 174 and is disposed at the center of the base rubber 172, is a so-called enter key that accepts user's final operation. The central key top 174a is made of a translucent material so as to guide light emitted from part of the LEDs 134 mounted on the printed circuit board 130 and radiate the light to the outside. Accordingly, the light emitted from the part of the LEDs 134 is transmitted to the user as illumination through the central key top 174a, providing an illumination effect.

The multi-directional input unit 176 is attached substantially at the center of the base rubber 172. The multi-directional input unit 176 is an input unit that has a rotationally operated encoder so that it may be rotated, pressed, and tilted. The multi-directional input unit 176 will be described later in detail.

The cover 178 is shaped like a rectangular plate and has a through-hole 186, through which part of the multi-directional input unit 176 passes, at the center. Screwed holes 188 are formed at the four corners of a surface of the cover 178, the surface facing the display-side case 110. Through-holes 118 are also formed on the back of the display-side case 110. The cover 178 is secured to the display-side case 110 by inserting screws 119 into the screw through-holes 118 and tightening the screws 119 into the screwed holes 188. When the cover 178 is secured to the display-side case 110, the cover 178 comes in contact with the flanges 180 of the key tops 174 and with a flange 150 of the multi-directional input unit 176, which will be described later, preventing the key tops 174 and the multi-directional input unit 176 from coming off the display-side case 110. With the cover 178 secured to the display-side case 110, the cover 178 is part of the display-side case 110.

The operation-side case 190 includes a key module 192 used to perform various operations on the mobile telephone 100. The operation-side case 190 includes a main body printed circuit board on which parts that perform various processes are mounted; the various processes include signal processing related to communication by the mobile telephone 100 and signal processing to display characters and images on the display panel. A side of the operation-side case 190 includes, for example, an operation key 194 used to adjust the volume of a call.

Figure 4:
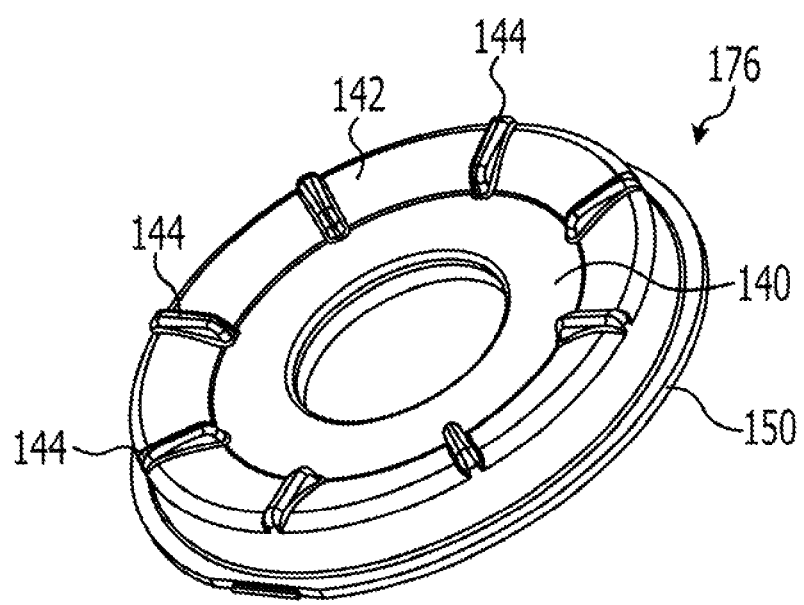
FIG. 4 is an enlarged perspective view of a multi-directional input unit.
Figure 5:
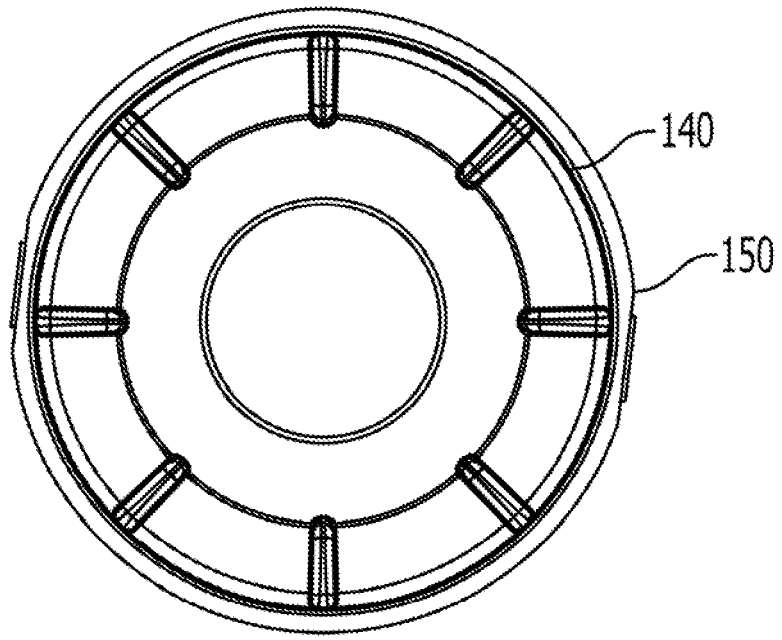
FIG. 5 is a plan view of the multi-directional input unit.
Figure 6:
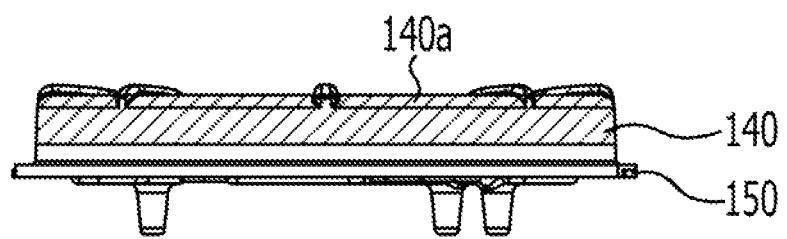
FIG. 6 is a side view of the multi-directional input unit.
Figure 7:
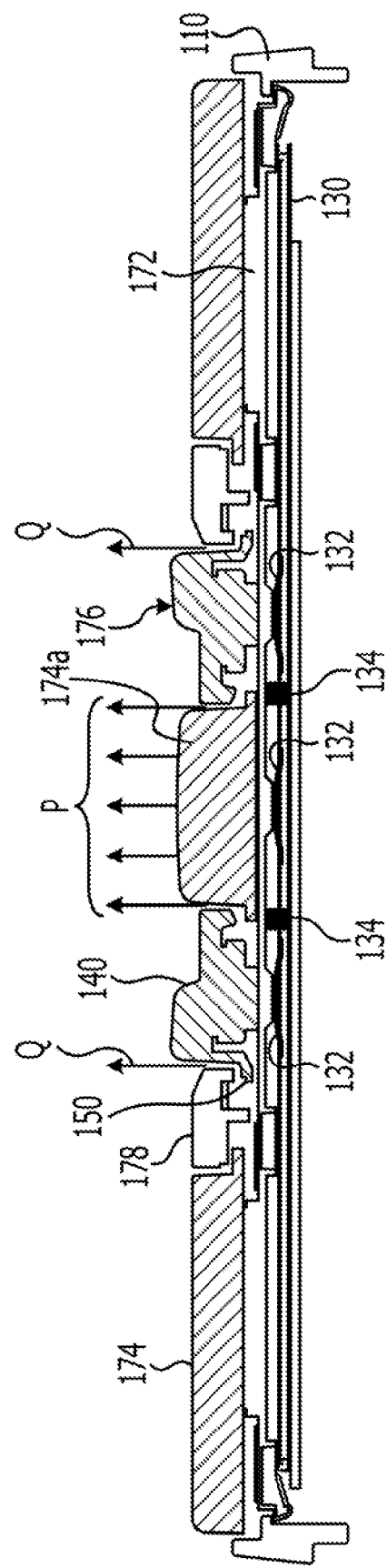
FIG. 7 is a cross sectional view of the display-side case, which illustrates a state in which the multi-directional input unit may be mounted.

Next, the multi-directional input unit 176 will be described in detail. FIG. 4 is an enlarged perspective view of the multi-directional input unit. FIG. 5 is a plan view of the multi-directional input unit. FIG. 6 is a side view of the multi-directional input unit. FIG. 7 is a cross sectional view of the display-side case, which illustrates a state in which the multi-directional input unit may be mounted.

As illustrated in FIGS. 4 to 6, the multi-directional input unit 176 is an input unit that internally includes a rotationally operated encoder. The multi-directional input unit 176 has a base 140, which is annularly shaped, and the flange 150 extending from the outer circumferential surface of the annular base 140.

The annular base 140 is annularly formed so as to enclose the central key top 174a (see FIG. 3) on the base rubber 172. A tilting part 142 is formed on a surface of the base 140, the surface being opposite to the base rubber 172, so that the tilting part 142 is thinned toward the center of the base 140. The tilting part 142 has a plurality of projections 144 that are radially disposed toward the center of the base 140. The tilting part 142 and the plurality of projections 144 receive the rotating, pressing, and tilting operations performed by the user for the multi-directional input unit 176, and transmit these operations to the rotationally operated encoder. This enables various functions of the rotationally operated encoder to be implemented.

The annular base 140 passes through the through-hole 186 formed in the cover 178, and forms a clearance between the through-hole 186 and the base 140, through which light radiated from the flange 150, described later, is guided.

The flange 150 fits the cover 178 secured to the display-side case 110. That is, the flange 150 is overlaid on the cover 178 in a state in which the cover 178 is secured to the display-side case 110. Accordingly, even if the multi-directional input unit 176 is displaced in a direction in which it moves apart from the base rubber 172 as a result of receiving an operation performed by the user, the flange 150 abuts the cover 178, preventing the multi-directional input unit 176 coming off the display-side case 110.

The flange 150 is made of a translucent material. The flange 150 guides light emitted from the relevant LEDs 134 mounted on the printed circuit board 130 and radiates the light to the outside. Accordingly, the light emitted from the LEDs 134 is transmitted to the user as illumination through the flange 150, providing a unique illumination effect together with illumination from the central key top 174a.

The flange 150 includes a light diffusing material that diffuses light emitted from the relevant LEDs 134. The light diffusing material is made of minute translucent spherical particles. The light emitted from the LEDs 134 hits the light diffusing material, and the flange 150 may thereby evenly diffuse the light to the circumference, creating a fantastic mood in which the external appearance of the flange 150 is emphasized by light.

The base 140 and flange 150 in this embodiment are integrally formed together of a translucent material, and a light shielding process 140a has been applied only to the base 140. Since the base 140 and flange 150 are integrally formed of the same material, the cost of manufacturing the multi-directional input unit 176 may be reduced. Since the light shielding process 140a has been applied only to the base 140, the light emitted from the LEDs 134 may be shielded by the base 140 and may be easily guided to the flange 150. As a result, a unique illumination may be easily achieved in which illumination from the flange 150 and illumination from the central key top 174a are combined.

Illumination from both the multi-directional input unit 176 and central key top 174a will be described. Part of the light emitted from the LEDs 134 mounted on the printed circuit board 130 is directed toward the central key top 174a on the base rubber 172 and passes through the central key top 174a, radiating the light from the central key top 174a to the outside. Accordingly, part of the light emitted from the LEDs 134 is transmitted to the user through the central key top 174a as illumination P, as illustrated in FIG. 7.

Another part of the light emitted from the LEDs 134 is directed toward the multi-directional input unit 176. Since the light shielded by the base 140 and passes through the flange 150, the light is radiated from the clearance between the base 140 and cover 178 to the outside. Thus, another part of the light emitted from the LEDs 134 is transmitted to the user through the flange 150 of the multi-directional input unit 176 as illumination Q.

Since the illumination P from the central key top 174a and the illumination Q from the flange 150 of the multi-directional input unit 176 are combined, fresh light may be transmitted to the user, efficiently improving the illumination effect.

As described above, in this embodiment, the flange 150 extends from the outer circumferential surface of the annular base 140, which encloses the outer circumferential surface of the central key top 174a, and the flange 150 fits the cover 178, which is part of the display-side case 110. The flange 150 guides light emitted from the LEDs 134 and radiates the light. In this embodiment, therefore, it is possible to improve the illumination effect and prevent the multi-directional input unit 176 from coming off the display-side case 110.

The flange 150 in this embodiment includes a light diffusing material that diverges light emitted from the LEDs 134. According to the embodiment, therefore, the light emitted from the LEDs 134 may be evenly dispersed when the flange 150 causes the light to hit the light diffusing material, creating an effect in which the external appearance of the flange 150 is emphasized by light.

The base 140 and flange 150 in this embodiment are integrally formed together of a translucent material, and a light shielding process 140a has been applied only to the base 140. According to the embodiment, therefore, the cost of manufacturing the multi-directional input unit 176 may be reduced. It is also possible to easily achieve a unique illumination in which illumination from the flange 150 and illumination from the central key top 174a are combined.

Although this embodiment has been described by using, as an example, a slide-type mobile telephone that uses a sliding mechanism to mutually link the display-side case 110 and operation-side case 190 so as to be slidable, this is not a limitation. The electronic device in this disclosure may also be applied to other than slide-type mobile telephones. For example, the electronic device in this disclosure may also be similarly applied to folding mobile telephones and mobile telephones that use a linking mechanism to rotate one case on a plane with respect to another case.

Although the electronic device in this embodiment has been applied to a mobile telephone as an example, this is not a limitation. The electronic device in this disclosure may also be applied to other various electronic devices including small information processing terminals, such as personal digital assistants (PDAs), small music playback units, mobile television sets, and mobile game machines.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device, comprising:
a case;
a light source;
a multi-directional input unit having an annular base defining a first through hole and a flange that extends from an outer circumferential surface of the annular base and fits within a part of the case, wherein a light shielding material is applied to the annular base shielding light emitted from the light source, and the flange including a light diffusing material that diffuses the light emitted from the light source, and radiating the diffused light along the outer circumferential surface to an exterior of the case;
a cover having a second through-hole through which part of the multi-directional input unit passes, the cover abutting the flange and being secured to the case; and
a translucent key top passing through the first through-hole of the annular base, wherein light is guided from the light source to the key top and to the flange of the annular base wherein a first illumination path between the key top and an inner circumferential surface of the annular base and a second illumination path between the cover and the outer circumferential surface of the annular base are formed by the annular base and light shielding material.

2. The electronic device according to claim 1, wherein the annular base and the flange are integrally formed together of a translucent material.

3. The electronic device according to claim 1, wherein:
the annular base is configured to pass through the second through-hole; and the flange is configured to radiate the light to the exterior of the case, through a clearance formed between the second through-hole and the annular base.

4. The electronic device according to claim 1, wherein the annular base is configured to guide the light emitted from the light source to the flange by the shielding.

5. The electronic device according to claim 1, wherein the flange is configured to radiate the light diffused by the light diffusing material, from an outer surface of the flange.

6. The electronic device according to claim 1, wherein the diffused light is radiated through the second illumination path.

7. The electronic device according to claim 1, wherein the light source underlies the inner circumferential surface of the annular base.

* * * * *